3,206,421
INTERPOLYMER LATEX COMPOSITIONS AND PROCESS
Claus Victorius, Media, Pa., assignor to E. I. du Pont de Nemours and Company, Wilmington, Del., a corporation of Delaware
No Drawing. Filed May 22, 1962, Ser. No. 196,612
17 Claims. (Cl. 260—29.3)

This invention relates to improvements in aqueous dispersion copolymer coating compositions which are capable of being deposited and cured to a coalesced copolymer composition having improved electrical insulating properties and to a process for preparing these compositions by an improved aqueous dispersion copolymerization technique.

Aqueous dispersion coating compositions consisting essentially of a water-insoluble coalescible carboxylate copolymer of acrylonitrile which is at least ternary in composition and a water-soluble or water-dispersible coalescing agent for the acrylonitrile copolymer are recognized as being particularly suitable in the cured coalesced state as electrical insulation, e.g., as wire enamel and impregnants for insulating fabrics such as glass fabric and other heat-resistant textile fabrics. Typical of such aqueous dispersion coating compositions useful for electrical insulating purposes are the compositions disclosed and claimed in U.S. Patent 2,787,603. The product of Example I of this prior art patent is particularly suitable as a wire enamel composition. In this example, the water-dilutable heat-reactive phenol/formaldehyde condensate functions as a film-forming coalescing agent for the aqueous latex of the particulate acrylonitrile copolymer. Examples II and III of this reference patent disclose the use of a volatile, water-soluble solvent, characterized by volatility less than that of water, as a coalescing agent in combination with the film-forming coalescing agent for the acrylonitrile. Use of the above characterized volatile solvent-type coalescing agent is disclosed and claimed in U.S. Patent 3,032,521.

The useful acrylonitrile copolymers defined in these reference patents are at least ternary in composition, prepared from a mixture of comonomers consisting essentially of 30 to 80 parts of acrylonitrile, 2 to 15 parts of an alpha mono-olefinically-unsaturated monocarboxylic acid, e.g., acrylic acid, methacrylic acid and other alpha-substituted acrylic acids, and 15 to 65 parts of an ester of these defined monocarboxylic acids with a lower saturated aliphatic monohydric alcohol, for a total of 100 parts of these comonomers. Useful quadripolymers, having in addition to the plurality of the above-identified ternary combination of comonomers a comonomer which provides the copolymer with vic-1,2-oxirane moieties, e.g., glycidyl esters of the defined mono-olefinically-unsaturated monocarboxylic acids or allyl glycidyl ether, are disclosed and claimed in U.S. Patent 2,787,561.

Ammoniacal treatment of these above-identified water-insoluble carboxylic acid terpolymers and quadripolymers of acrylonitrile, which provides improved package stability and resistance to gelation to the resulting water-insoluble carboxylate copolymer, is disclosed and claimed in U.S. Patent 2,866,763.

Commercial utilization of these aqueous latex compositions subject to widely varying conditions and different types of substrates to which the electrical insulation is applied, imposes certain essential requirements on the latex composition to provide commercially acceptable application. Control of the surface tension of the hereinabove described aqueous latex of copolymers of acrylonitrile to a value of at least 50 dynes/cm. results in desirable improvements in the application of such wire enamel compositions, particularly in reference to coating small diameter magnet wire. These latex wire enamel compositions prepared using alkali-stabilized colloidal silica particles, e.g., "Ludox" LS colloidal silica, as a nucleating agent for the carboxylic acid copolymer of acrylonitrile in lieu of emulsifying agents and other surfactants which normally depress the surface tension to a value significantly below 50 dynes/cm., are disclosed and claimed in copending application Bullitt et al., Serial No. 688,132, filed October 4, 1957, now U.S. Patent 3,069,375.

Commercial latex products of the inventions defined by these several reference patents indicative of the status art leave something to be desired in reference to consistent uniform quality, improved performance under coil winding operations and improved resistance to chlorofluoroalkane refrigerants, e.g., "Freon" 22.

It is now found surprisingly that significant improvements in this direction are accomplished in these aforementioned water-insoluble carboxylic acid copolymers and ammonium carboxylate copolymers when the aqueous dispersion copolymerization is conducted in two stages having the second stage copolymerization initiated in the presence of the aqueous dispersion copolymer product resulting from carrying the first stage copolymerization to 85% or higher conversion of the comonomers thereof and then carrying the copolymerization of total charge of polymerizable comonomers from the first and second stages to about 95% or higher conversion under improved copolymerization conditions hereinafter defined.

More specifically, the desired improvements are accomplished by an improved two-stage copolymerization process for the preparation of an aqueous latex of a water-insoluble copolymer, at least ternary in composition, of a plurality of polymerizable alpha monoethylenically-unsaturated comonomers consisting essentially of (a) acrylonitrile, (b) at least one polymerizable neutral ester of an alpha mono-olefinically-unsaturated carboxylic acid, preferably having a terminal methylene group, with a monohydric alcohol which is composed of carbon, hydrogen and oxygen atoms and is free of polymerizable carbon-to-carbon unsaturation, and (c) at least one alpha mono-olefinically-unsaturated carboxylic acid, preferably having a terminal methylene group and more particularly having three to five carbon atoms per molecule, in a proportion of at least about 1.7 parts and sufficient to provide an acid number in the range of 15 to 80, based on 100 parts total weight of comonomer content. The process comprises the steps of: (I) supplying the indicated plurality of comonomers as a first comonomer charge (A), which is at least ternary in composition, having the comonomers (a), (b) and (c) present therein, and a second comonomer charge (B) which is at least binary in composition, having at least the comonomers (a) and (b) present therein, comonomer charge (B) optionally containing species of comonomer (c), and preferably having (c) present therein; (II) dispersing comonomer charge (A) in an aqueous polymerization medium; (III) initiating and continuing copolymerization of first comonomer charge (A) in the presence of a soluble free-radical-generating vinyl polymerization initiator, preferably a redox combination initiator, until conversion of the monomers is at least 85% complete, preferably 90% or higher conversion, the proportion of initiator being sufficient to provide the indicated conversion, preferably within a first stage reaction period of 30 to 120 minutes at a polymerization temperature in the range of 45° C. to about 90° C., preferably 55° C. to 85° C.; (IV) dispersing second comonomer charge (B) in the resulting aqueous latex of the copolymerization of first stage comonomer charge (A); and (V) initiating copolymerization of second comonomer charge (B) in the presence of an additional amount of the soluble free-radical-generating vinyl polymerization initiator and continuing copolymerization until conversion of the total monomer content of charge (A) plus charge (B) is at least 95% complete, the proportion of initiator being sufficient to provide at least 95% conversion preferably within a second stage reaction period of 60 to 240 minutes at a temperature in the range of 45° C. to about 90° C., preferably 55° C. to 85° C. Although the resulting carboxylic acid copolymer latex can be used at the resulting acidic pH which ordinarily is no greater than about 4, the process preferably includes a further step (VI) of ammoniacally treating the resulting water-insoluble carboxylic acid copolymer with ammonium hydroxide or other volatile salt-forming reactants to react with carboxyl moieties of the copolymer to provide carboxylate moieties with the aqueous latex of the resulting carboxylated copolymer preferably having a pH in the range of 5.5 to 8 and being stabilized thereby.

Although the resulting aqueous latex of the carboxylic acid copolymer and the carboxylated copolymer have utility as coating compositions and impregnants, it is preferred to enhance the coalescibility of the particulate copolymer on deposition from the latex, drying and curing by including a still further step (VII) of blending a suitable proportion of a coalescing agent with the aqueous latex of the copolymer. The coalescing agent can be a water-dispersible organic film-forming material which is compatible with the copolymer, e.g., water-dilutable heat-reactive phenol/formaldehyde condensate or condensates of formaldehyde with urea, melamine, benzoguanamine or mixtures thereof, these latter condensates usually being modified with a monohydric alcohol which etherifies the hydroxymethyl moieties of the condensates. Useful proportions of these modifying film-forming materials usually range up to about 40 parts per 100 parts of the copolymer, preferably 5 to 20 parts. Water-soluble solvents for the copolymer which are less volatile than water can be used as coalescing agents. Useful proportions of the volatile solvent-coalescing agent can range significantly higher than the proportions indicated for the film-forming modifier, e.g., proportions as high as 150 parts per 100 parts of the copolymer are not unusual. Excessive amounts of the water-soluble solvent for the copolymer can cause coagulation of the copolymer particles in the aqueous latex due to high solvent action.

The distribution of the total content of comonomers in the first monomer charge (A) and the second monomer charge (B) is important to the process. Comonomers (a) and (b) are present in both charges (A) and (B) and comonomer (c) is at least present in charge (A) in a proportion preferably sufficient to provide an acid number of at least 15. The relative proportion by weight of the respective comonomers (a) and (b) in the comonomer charges (A) and (B) is from 0.8 to 1.2, preferably 0.9 to 1.1, times the relative proportions of the respective comonomers (a) and (b) in the total comonomer composition. The relative proportion of the carboxylic acid monomer (c) in charge (B) is no greater than two times the proportion of (c) in the first charge (A) on a carboxyl basis and (c) may be omitted entirely from charge (B). Preferably all species of (a), (b) and (c) are present in both charges (A) and (B), the proportion of comonomer (c) in charge (B) ranges from 0.5 to 1.5 times the proportion of comonomer (c) in charge (A) on a carboxyl basis. The weight ratio of the second charge (B) is from about 0.67 to 1.5, preferably 0.8 to 1.25, per part of the first charge (A).

One hundred parts by weight of the total comonomer content consists essentially of (a) 25 to 80 parts of acrylonitrile, (b) at least 15 parts of at least one of the hereinafter defined neutral ester comonomers, and (c) an amount of the carboxylic acid comonomer sufficient to provide an acid number in the range of 15 to 80. The proportion of acrylonitrile ordinarily is at least 25 parts in order to provide a significant contribution thereof to the resulting copolymer, and the proportion thereof ordinarily does not exceed 80 parts in order that the copolymer exhibits adequate coalescibility. Preferably the content of acrylonitrile is in the range of 30 to 70 parts. A proportion of 50 to 70 parts of acrylonitrile is particularly useful in the copolymers intended for utility as electrically insulating wire enamels. However, copolymers having a lower content of units derived from acrylonitrile can be advantageously used also as electrical insulation, e.g., glass fabric impregnated with these copolymers having from 30% to 50% of copolymerized acrylonitrile units provide excellent electrical insulating components such as slot liners for electric motors.

Neutral ester comonomer (b) useful in preparing the carboxylic acid copolymers of this invention can be neutral esters of any of the hereinafter defined acids useful as comonomer (c) fully esterified with a monohydric alcohol which is free of polymerizable carbon-to-carbon unsaturation and which alcohol is composed of hydrogen, oxygen and carbon atoms, the carbon atoms being from 1 to 20. Preferably, the esterifying alcohol is a lower saturated aliphatic monohydric alcohol, i.e., having up to 8 carbon atoms. In preferred embodiments, at least 50% by weight of the comonomer (b) is a neutral ester of a $C_1$ to $C_4$ alkanol with the preferred $C_3$ to $C_5$ species of the defined carboxylic acid comonomer (c), and especially $C_1$ to $C_4$ alkanol esters of acrylic acid or methacrylic acid.

While the esterifying monohydric alcohol component of the monoesters and neutral esters has a single hydroxyl, additional carbon-attached oxygen atoms may be present therein as ether oxygen or oxirane oxygen, the oxirane oxygen perferably being a single vic-epoxy group. Typical of neutral esters having a vic-epoxy group are glycidyl acrylate and glycidyl methacrylate. Ether oxygen may be introduced by esterification with an alkoxy alkanol, e.g., $C_1$ to $C_4$ alkanol monethers of ethylene glycol, or a polyoxyalkylene alkanol, e.g., alkanol ethers of diethylene glycol, alkanol monoethers of polyethylene glycol, alkanol monoethers of dipropylene glycol, alkanol monoethers of polytetramethylene glycol, and alkanol monoethers of glycols having a plurality of species of oxyalkene units in the polyoxyalkylene radical linking the hydroxyls of the glycol. In these esterifying monohydric alcohols having more than one oxygen atom per molecule, the second oxygen atom is at least two carbon atoms removed from the hydroxyl oxygen atom and any additional oxygen atom is at least two carbon atoms removed from a second oxygen atom in the molecule.

Useful alpha mono-olefinically-unsaturated carboxylic acid comonomers (c) are typified by methacrylic acid, acrylic acid, itaconic acid, ethacrylic acid, phenyl acrylic acid, crotonic acid, partial esters of itaconic acid, maleic acid and fumaric acid with a saturated aliphatic monohydric alcohol, or mixtures of these carboxylic acid monomers. Preferably, carboxylic acid comonomer (c) consists essentially of at least one $C_3$ to $C_5$ alpha mono-olefinically-unsaturated carboxylic acid having a terminal methylene group and one to two carboxyl moieties per molecule, i.e., methacrylic acid, acrylic acid, ethacrylic acid and itaconic acid. Acrylic acid, the lowest molecular weight species, in the proportion of from about two parts to about 10 parts provides the indicated acid number of 15 to 80. The dicarboxylic itaconic acid, having a lower carboxylic acid equivalent weight, in about 1.7 parts to 9.3 parts provides this range of acid number. Although carboxylic acid monoesters of the aforementioned dicarboxylic acids can be used as the sole contributing carboxylic acid comonomer (c), their use is preferably in combination with the indicated preferred species of unesterified carboxylic acid comonomer (c) present in a proportion sufficient to at least provide the minimum acid number of 15. The esterifying alcohol component of these carboxylic acid monoesters can be any of the monohydric alcohols hereinbefore defined as useful as the esterifying alcohol component of the neutral ester comonomer (b).

The respective comonomer can be used in their inhibited state as supplied commercially having an inhibitor content ordinarily ranging from 20 to 500 p.p.m. based on the weight of the respective monomers or they can be used in an inhibitor-free state. Preferably, the polymerization is conducted in the presence of the ordinary polymerization inhibitors in a proportion usually no greater than 100 p.p.m. based on the total monomer composition, preferably 25 to 50 p.p.m. Hydroquinone and monomethyl ether of hydroquinone are typical of commonly used inhibitors. Some inhibitors at their ordinary useful proportion, e.g., beta,beta'-imino-dipropionitrile, significantly retard redox-initiated polymerization; thus requiring an unduly long polymerization period. While such retardative inhibitors can be tolerated, they are preferably avoided or eliminated from the monomer charge. Inhibitor removal, when desirable, can be accomplished by vacuum distillation or other means well recognized in the art.

The proportion of total weight of copolymerizable monomers relative to the total weight of the aqueous latex recipe can range satisfactorily from about 20% to 50% and in some instances up to 60%, preferably 25% to 40%. As indicated, the weight ratio of second comonomer charge (B) can range from 0.67 to 1.5 parts per part of first comonomer charge (A). Thus, based on the indicated 20% total, the first stage polymerization may contain as little as 8% of copolymerizable monomers provided by first charge (A); second charge (B) providing the remaining 12% of comonomers, or in the reverse proportions. At the indicated preferred maximum total monomer content of 40%, first comonomer charge (A) provides from 16% to 24%, and second comonomer charge (B) provides complementally 24% to 16% of the total weight of the latex recipe.

Any of the ordinary free radical-generating vinyl polymerization initiators capable of functioning in an aqueous medium can be used in usual effective proportions to initiate the polymerization, e.g., persulfates, perborates, percarbonates, hydrogen peroxide and organic peroxides, such as benzoyl peroxide, tertiary butyl perbenzoate and tetralin peroxide. Preferably, the initiator is a redox combination of a water-soluble persulfate, e.g., potassium, ammonium or sodium persulfate, as the oxidizing component and a bisulfite, e.g., sodium, potassium or ammonium meta-bisulfite, as the reducing component of the redox combination. Soluble salts of sulfites, hydrosulfites and thiosulfates can be used in lieu of the metabisulfites. Other typical useful redox combination iniators are: sodium azide and ceric ammonium sulfate, titanium trichloride and acetone oxime or hydroxyl amine, copper sulfate and benzenediazo-phenyl sulfone, and divalent vanadium ion and hydroxyl amine hydrochloride.

Generally, useful proportions of the polymerization initiator is in the range of 0.05% to 3% based on the total weight of the monomers. Preferably, the indicated persulfate/bisulfite redox initiators are used in a proportion of about 0.05 to 0.15 mole percent of the oxidizing component thereof and about 0.03 to 0.1 mole percent of the reducing component thereof based on the total comonomer charge. The redox combination can be further activated by the presence of polyvalent metal ions, e.g. iron and copper ions, in the proportion ranging from about 0.1 p.p.m. and ordinarily not exceeding about 10 p.p.m. based on the water content of the recipe. Tertiary amines soluble in the aqueous reaction mixture can also be used as an activator for the redox initiator.

The aqueous medium for polymerization may contain soluble surfactants, emulsifiers or dispersants to disperse the water-insoluble monomers in the aqueous medium. Surfactants or dispersants useful in emulsifying the monomers and in maintaining the resulting copolymer in aqueous dispersion include water-soluble salts of fatty alcohol half esters of sulfuric acid, e.g., sodium and potassium lauryl sulfates and other such ester salts where the fatty alcohol contains from 8 to 24 carbon atoms, alkylphenoxypolyethanoxyethanols where the alkyl substituent contains from 7 to 12 carbon atoms, e.g., octyl and nonyl, and the polyethanoxyethanol group is of sufficient chain length to provide water-solubility, this group corresponding preferably to an adduct of 20 to 50 mols of ethylene oxide, water-soluble ethylene oxide adducts of fatty alcohols, and ethylene oxide derivatives of long chain fatty acids. Other ionic and non-ionic water-soluble surfactants commonly used in aqueous emulsion polymerization can be used in lieu of those indicated above.

Generally, the proportion of the water-soluble dispersant or emulsifier ranges up to about 3 parts based on 100 parts by weight of the monomers, but may be as high as 5 parts on this basis and as low as 0.01 part. When present, the emulsifier is preferably in the proportion ranging from 0.03 part to 1 part on the indicated basis. Higher dispersant concentrations generally result in smaller particle-size and dispersions of lower polymer content. Generally, the dispersed polymer particles are substantially uniform in particle size, the average particle diameter being in the range of about 0.1 micron to several microns, preferably in the 0.2 to 0.5 micron range.

With suitable agitation, the monomers can be satisfactorily dispersed and suspended in the aqueous medium for polymerization without the aid of ordinary ionic and non-ionic emulsifiers. Silica particles of particle size in the range of 5 to 150 millimicrons, introduced into the aqueous polymerization medium as an aquasol of alkali-stabilized silica particles, can be used advantageously in lieu of the ordinary emulsifying surfactants. An extremely small proportion of alkali such as $Na_2O$, $K_2O$, $Li_2O$ and $NH_3$ is required to stabilize the silica particles, the $SiO_2$ ratio ordinarily being in the range of 75 to 700 parts of $SiO_2$ per part of the alkali expressed as $Na_2O$. Commercially available "Ludox" colloidal silica is typical of aquasols of the stabilized silica particles having the submicron particle size. Use of such silica particles in lieu of oridnary emulsifiers is more fully described and claimed in copending application Bullitt et al., Serial No. 688,132, filed October 4, 1957. Copolymerization in the absence of ordinary water-soluble surfactants of the ionic and non-ionic types provides a latex characterized by an advantageously high surface tension value which cannot be obtained in the presence of such surfactants.

Water used as the polymerization medium is preferably deionized or distilled in order to provide water of controlled quality to which the addition of metal ions in the order of magnitude of 0.1 to 10 p.p.m. contributes a significant effect on processing time in combination with the polymerization initiator. The polymerization vessel ordinarily is constructed of material which will minimize inadvertent introduction of significant proportions of metal ion into the polymerization medium.

The polymerization reaction vessel is equipped with agitation means for maintaining suitable agitation during polymerization. The degree of agitation can range from slow at about 20 r.p.m. to fast at about 300 r.p.m. Preferably, the agitation is slow to moderate in the range of about 30 to 150 r.p.m., usually sufficient to exhibit a detectable vortex in the agitated charge.

The reaction vessel is equipped with controllable heating and cooling means to provide reaction temperature control during processing, the reaction temperature usually in the range of about 45° C. to about 90° C. or even up to reflux temperature, the reaction preferably being carried out at a temperature in the range of 55° to 85° C.

Conditions for the copolymerization are so selected that at least 85%, preferably at least 90%, conversion of first comonomer charge (A) is accomplished during a reaction period ranging from about 30 minutes to about 120 minutes and at least 95% conversion of the total charge of comonomers, i.e., charge (A) plus charge (B), is accomplished during a reaction period of 60 to 240 minutes after the addition of comonomer charge (B).

After the indicated conversion of the comonomers, the latex is preferably cooled to a temperature in the range of 10° C. to 25° C., although the composition may be allowed to cool naturally to room temperature without specific cooling. The resulting aqueous latex of the water-insoluble carboxylic acid copolymer of acrylonitrile is characterized ordinarily by a pH no greater than about 4. This acidic latex is preferably treated with a volatile alkaline material, e.g., with ammonium hydroxide, water-soluble amines or water-soluble salt-forming organo-ammonium compounds, to a pH of at least 5 and ordinarily no greater than 9, preferably in the range of 5.5 to 8. This carboxylate treatment can be carried out either while the acidic latex is at an elevated temperature or after it has been cooled. For some purposes, it is preferred to carry out the ammoniacal treatment in two stages, with the initial stage being to a pH in the range of 5.5 to 6.5 followed by filtration and a second stage ammoniacal treatment to a pH in the range of 6.7 to 8 as disclosed and claimed in U.S. Patent 2,866,763. Where stability of the latex for lengthy storage is of no consequence, the acidic latex can be treated to a higher pH, e.g., up to 9 or 10. However, in this more highly alkaline state, the carboxylate latex exhibits a tendency toward early bodying and gelation, necessitating prompt use of the latex.

In the preparation of coating compositions from the aqueous latex of the copolymer, the latex, stabilized as indicated above, is blended with a water-dilutable heat-reactive phenol/formaldehyde condensate or a condensate of formaldehyde with urea, melamine, benzoguanamine or combinations of these reactants following the general teachings of U.S. Patent 2,787,603. The proportion of these condensates usually ranges from about 2 to 40 parts per 100 parts by weight of the copolymer, preferably about 5 to 20 parts. Water-soluble volatile organic liquids which are less volatile than water and which have a solvency for the copolymer, can be used in combination with the modifying film-forming condensates or in lieu thereof to serve as coalescing agents for the particulate copolymer following the general teachings of U.S. Patent 3,032,521.

The aqueous compositions can be pigmented or otherwise extended with material in ordinary proportions which do not significantly alter the stability of the latex.

The following examples are provided to illustrate the principles and practice of the invention, but the scope thereof is not limited to the exact details of these typical examples. Unless otherwise indicated, the parts and percentages are given by weight.

EXAMPLE 1

| | Parts by weight |
|---|---|
| First portion: | |
| Deionized water | 1276.5 |
| "Ludox" LS colloidal silica, 30% SiO$_2$ | 12.8 |
| Aqueous ferrous sulfate solution, 0.0272% | 15.0 |
| Second portion: | |
| (a) Acrylonitrile | 241.3 |
| (b) Butyl acrylate | 122.5 |
| (c) Methacrylic acid | 19.2 |
| Comonomer charge (A) | 383.0 |
| Third portion: Aqueous solution of redox initiator | 100.0 |
| Fourth portion: | |
| (a) Acrylonitrile | 241.3 |
| (b) Butyl acrylate | 122.6 |
| (c) Methacrylic acid | 19.1 |
| Comonomer charge (B) | 383.0 |
| Fifth portion: Aqueous solution of redox initiator | 100.0 |
| Sixth portion: 6 N aqueous ammonium hydroxide | 6.2 |
| | 2276.5 |

The composition of the first comonomer charge (A) in 100 parts by weight thereof is: (a) 63 parts of acrylonitrile, (b) 32 parts of butyl acrylate, and (c) 5 parts of methacrylic acid. The composition of the second comonomer charge (B) is the same as that of charge (A). The weight ratio of charge (B) to charge (A) is 1:1. While the recipe shows separate preparation of the two comonomer charges, alternatively, the total monomer content can be blended in a separate weigh tank as a master batch with one-half of the total content introduced into the reaction mixture as first charge (A) and the remaining half introduced as second charge (B). Each of the monomers (a), (b) and (c) are of the ordinary commercially available inhibited grade of monomer. The acrylonitrile contains 25 p.p.m. of MEHQ, i.e., methylether of hydroquinone, as inhibitor. The butyl acrylate contains 50 p.p.m. of MEHQ and the methacrylic acid contains 250 p.p.m. of MEHQ. The inhibitor content based on the total monomer combination is about 34.3 p.p.m.

"Ludox" LS colloidal silica is an aquasol of alkali-stabilized silica particles having a silica content of 30%. The ratio of SiO$_2$ to the stabilizing Na$_2$O is about 285 to 1 and the approximate particle diameter of the silica particles is about 15 millimicrons. Other useful aquasols of stabilized silica particles are defined in Table 1 of the reference copending application Bullitt et al., Serial No. 688,132, filed October 4, 1957, now U.S. Patent 3,069,375.

The aqueous ferrous sulfate solution provides iron ions, i.e., polyvalent metal ions, to serve as an activator for the redox initiator. The indicated proportion corresponds to about 1 p.p.m. based on the water content. The aqueous solution of initiator consists of 2.48 parts of potassium persulfate, assay 99% K$_2$S$_2$O$_8$ minimum, and 0.653 part of sodium metabisulfite, assay 98.5% Na$_2$S$_2$O$_5$ minimum, dissolved in 197 parts of deionized water.

The polymerization equipment consists essentially of a glass reaction vessel equipped with a glass stirrer having controllable stirring means and equipped with heating and cooling means for temperature control.

The first portion is charged into the reaction vessel followed by addition of the second portion, i.e., comonomer charge (A), with moderate agitation to disperse the monomers. The resulting dispersion is heated to about 50° C. and then the third portion, i.e., redox initiator, is added thereto. The temperature is held at about 50° C. until the exothermic reaction starts, then the temperature permitted to rise to about 60° C., and held at 60° to 61° C. by appropriate cooling until the exotherm is over. The reaction exhibits slowing down in about 14-15 minutes after initiation. Then the reaction mixture is cooled to about 53° C. over about a 20-minute period and sampled for copolymer content. The fourth portion, i.e., comonomer charge (B), is then added, followed by immediate addition of the fifth portion, i.e., the redox initiator, causing the temperature to drop to about 48° C., stirring being vigorous to rapidly disperse the monomer and initiator in the resulting first stage copolymerization latex composition. The exothermic reaction of the second stage initiates within several minutes and the temperature is permitted to rise to about 60° C. and is held at 60° to 61° C. by appropriate cooling. The reaction begins to slow down in about 20 minutes after initiation and the temperature begins to drop without specific cooling in 35 to 40 minutes, and heat is then applied to maintain the 60°–61° C. temperature for a second stage reaction period of about 95 minutes. The resulting copolymer latex is cooled to room temperature of about 25° C., sampled for copolymer content, and thereafter the sixth portion is added and mixed therewith providing the latex with a pH of 6.2. The ammoniacal latex is filtered through felt and muslin to remove the small proportion of coagulum formed.

The latex at the end of the first stage copolymerization has a polymer content of 19.75%, indicating 90.8% conversion of comonomer charge (A), and a polymer content of 33.14% at the end of the second stage copolymerization, indicating 97.6% conversion of the total content of comonomers of charge (A) plus charge (B).

EXAMPLE 2

The polymerization recipe is the same as specified in Example 1, using the same ingredients. The essential difference is that in both the first stage polymerization and the second stage polymerization, the temperature during the respective exothermic reactions is permitted to rise to about 75° C. and is held at 75° to 76° C. during the respective polymerization periods. The first reaction period is about 45 minutes, followed by cooling to about 50° C. for addition of charge (B) and the second reaction period is about 90 minutes, followed by cooling to room temperature.

Conversion of comonomers at the end of the first stage is 91.6% and conversion at the end of the second stage is 98.5%. The copolymer yield of the filtered latex is 97.0%, indicating an improvement in yield over that of the filtered latex of Example 1 which was 94.9%.

The latex of Example 2 is converted to a wire enamel composition as follows.

*Wire enamel*

| First portion: | Parts by weight |
| --- | --- |
| Example 2 filtered latex, 33.44% | 2084 |
| Deionized water | 308.7 |
| Concentrated ammonium hydroxide, 28% | 15.9 |
| | 2408.6 |

The first portion is blended, heated to 75° C. held at this temperature for 25 minutes, and cooled to room temperature, the yield being 2392 parts of ammoniacally heat-bodied latex.

*Wire enamel*

| | Parts by weight |
| --- | --- |
| First portion: Ammoniacal latex from Example 2 | 2392 |
| Second portion: | |
| Water-dilutable heat-reactive phenol/formaldehyde resin solution, 66% (Bakelite Resin BRL-1100) | 116.3 |
| Deionized water | 189.8 |
| | 2698.1 |

The second portion is blended with the first portion. The resulting product, filtered through felt and muslin, has a non-volatile film-forming content of 28.5%, the composition thereof being 90 parts of copolymer and 10 parts of the phenolic resin. The aqueous dispersion enamel has a pH of 7.3 and a viscosity of 29 cps. at 25° C. using a Brookfield viscosimeter No. 1 spindle at 6 r.p.m.

The latex product of Example 1 is converted in an identical manner to a wire enamel composition having the same content of film-forming material.

A comparative latex wire enamel of the same analytical composition is prepared following the teachings of Bullitt et al., Serial No. 688,132, filed October 4, 1957, i.e., Example 1 therein, for the preparation of the latex which is subsequently ammonically heat-bodied and blended with a sufficient proportion of an aqueous solution of water-dilutable heat-reactive phenol/formaldehyde condensate (Bakelite Resin BRL-1100) to provide a ratio of 90 parts copolymer and 10 parts of phenolic resin at 28.5% solids. A second comparative enamel having the same analytical composition is prepared following the general teachings of Example 3 of U.S. Patent 2,866,763.

These several enamels are diluted with deionized water to a solids content of 20% and coated on #18 copper wire by dip coating using a conventional wire-coater. The uncoated wire is annealed at about 470° C. and the 12-foot curing oven has a temperature which ranges from about 160° C. at the bottom to a peak temperature of about 350° C. at the top. The wire coating speed is about 33 feet per minute and the wire is coated with a plurality of passes to provide an increase in diameter of about 3 mils for the coated wire, i.e., the insulation is about 1.5 mils thick.

The resulting coated wires are comparable in dielectric strength of the insulation, cut-through temperature, abrasion resistance, and other electrical properties as evaluated according to recognized test method described in columns 4 and 5 of U.S. Patent 2,787,603.

In resistance to refrigerant, "Freon" 22, monochlorodifluoromethane, the wire coated with the enamel of Examples 1 and 2 of this invention are free of blistering, swelling and yellowing, whereas the comparative enamels exhibit yellowing and detectable blistering.

In carrying out the test, five 6-inch lengths of coated wire of each coating are placed in an aerosol tube which is evacuated, while in a freezing bath is filled half full with liquid refrigerant "Freon" 22, closed, and then submerged in a 25° C. bath for 16 hours. Thereafter, the respective tubes are returned to the freezing bath for removal of the wires from the refrigerant. One minute after removal from the refrigerant, the test wires are each suspended in a convection over at 140° C. for 5 minutes and then removed for visual examination for blistering or swelling and discoloration.

In comparative coil winding tests simulating motor winding, the wires coated respectively with the cured enamels of Examples 1 and 2 exhibit significantly fewer insulation breaks per 100 feet of wire than the wire insulated with the comparative enamel. These improvements are indeed surprising inasmuch as the sole differences between the invention compositions and the comparative composition resides in the process by which the copolymer latex is prepared, i.e., two-stage copolymerization versus single stage as represented by the comparative enamels which have been found to be commercially acceptable.

EXAMPLE 3

The same over-all recipe as indicated in Example 1, with the polymerization conditions as indicated in Example 2 are used, but the total comonomer composition is prepared as a blended master batch and first comonomer charge (A) and second comonomer charge (B) are proportionately charged from the master blend. Example 3 has equal weight proportions of charge (A)

and charge (B). Example 3a has 40% of the total comonomers introduced as charge (A) and 60% as charge (B), i.e., the ratio of (B) to (A) is 1.50. Example 3b has a reverse ratio of 60% as charge (A) and 40% as charge (B), i.e., a ratio of (B) to (A) at about 0.67. Example 3c has about 45% as charge (A) and 55% as charge (B), i.e., a ratio of (B) to (A) at about 1.22, and Example 3d has about 55% as charge (A) and 45% of the total content of comonomers as charge (B), i.e., a ratio of (B) to (A) at about 0.82. The resulting copolymer latex compositions are all comparable to that of Example 2. Wire enamel compositions formulated with these copolymer latexes as described in Example 2 provide comparable insulated wire, the insulated wire from Example 3, 3c and 3d latexes being fully equivalent to the Example 2 insulated wire. The wire from Examples 3a and 3b are rated second best, but these also exhibit the advantageous improvement over the aforementioned comparative enamels.

EXAMPLE 4

In another series of experiments in which the total comonomer composition is identical with that of Examples 1, 2 and 3, the respective comonomer compositions of the initial charge (A) and the second charge (B) are varied, the polymerization conditions being as recited in Example 2. In Example 4, the recipe is identical with that of Example 1 except that the entire amount of methacrylic acid is included in the initial charge (A), i.e., 38.3 parts of methacrylic acid with none being included in charge (B). Example 4a is identical with Example 4 except that all the methacrylic acid is included in charge (B) with none in charge (A). In Example 4b, based on 100 parts by total weight of comonomers, charges (A) and (B) have the following respective composition:

|  | Charge (A) | Charge (B) |
| --- | --- | --- |
| (a) Acrylonitrile | 28.5 | 34.5 |
| (b) Butyl acrylate | 16.0 | 16.0 |
| (c) Methacrylic acid | 2.5 | 2.5 |
|  | 47.0 | 53.0 |

In Example 4c, the respective charges are reversed, i.e., charge (A) consists of 34.5 parts of acrylonitrile, 16 parts of butyl acrylate and 2.5 parts of methacrylic acid. In Example 4d, based on 100 parts of the total content of comonomers, comonomer charges (A) and (B) have the following respective composition:

|  | Charge (A) | Charge (B) |
| --- | --- | --- |
| (a) Acrylonitrile | 31.5 | 31.5 |
| (b) Butyl acrylate | 13.0 | 19.0 |
| (c) Methacrylic acid | 2.5 | 2.5 |
|  | 47.0 | 53.0 |

All these examples, except Example 4a, provide aqueous copolymer latex compositions equivalent to the Example 2 latex and comparable wire enamels when these latexes are blended as described with water-dilutable, heat-reactive phenol/formaldehyde resin in the indicated proportions. Example 4a fails to provide a satisfactory first stage aqueous dispersion copolymer composition in the absence of the carboxylic acid comonomer (c), i.e., methacrylic acid, in comonomer charge (A).

Ethyl acrylate substituted wholly or in part for the butyl acrylate in the foregoing examples provides a comparable copolymer latex and wire enamel which exhibits the indicated improvements. Acrylic acid substituted for the methacrylic acid in the foregoing examples provides a comparable copolymer and wire enamel.

EXAMPLE 5

|  | Pounds |
| --- | --- |
| First portion: Deionized water | 2400 |
| Second portion: | |
| Comonomer charge (A)— | |
| (a) Acrylonitrile | 460 |
| (b) Butyl acrylate | 233.5 |
| (c) Methacrylic acid | 36.5 |
| Third portion: | |
| Deionized water | 75.0 |
| "Ludox" LS colloidal silica aquasol, 30% SiO$_2$ | 24.3 |
| Ferrous ammonium sulfate | .02 |
| Fourth portion: | |
| Deionized water | 150 |
| Ammonium persulfate | 2.0 |
| Sodium meta-bisulfite | 0.62 |
| Fifth portion: | |
| Comonomer charge (B)— | |
| (a) Acrylonitrile | 460 |
| (b) Butyl acrylate | 233.5 |
| (c) Methacrylic acid | 36.5 |
| Sixth portion: Deionized water | 62 |
| Seventh portion: | |
| Deionized water | 150 |
| Ammonium persulfate | 2.0 |
| Sodium meta-bisulfite | 0.62 |
| Eighth portion: | |
| Concentrated ammonium hydroxide, 28% | 1.0 |
| Deionized water | 9.0 |
|  | 4336.56 |

The first portion is charged into a weigh tank, heated to about 68° C. and dropped into a 500-gallon polymerization reactor. The second portion is charged into the weigh tank, blended for about 10 minutes, heated to about 38° C. to 49° C. dropped into the reactor where it is dispersed in the water using slow to moderate mixer agitation, i.e., about 40 r.p.m. The third portion is prepared separately and dropped into the reactor and the batch temperature is then adjusted to about 52° C. The fourth portion is charged into the weigh tank. Agitation of the batch is increased to moderate, i.e., about 70 r.p.m., and as the temperature decreases 1° C., the fourth portion is dropped into the reactor and the temperature of the batch is allowed to rise to 60° C. without specific cooling. When the rate of temperature rise is at least 1° C. per minute, cooling is initiated at such a rate as to permit the temperature to reach a peak in the range of about 77° C. to 83° C. When the temperature of the batch reaches about 70° C. to 71° C., agitation is reduced, i.e. to about 50 r.p.m. As the temperature shows a decline from the peak or remains constant for at least 10 minutes, agitation is decreased further, i.e. to about 30 r.p.m., and the batch is cooled to about 65° C. Then the fifth portion is dropped into the reactor from the weigh tank where it has been previously heated to 38° C. to 49° C., and agitation is increased to moderate, i.e. to about 60 r.p.m.

The sixth and seventh portions are dropped to the reactor and the batch temperature is permitted to rise to about 60° C. without specific cooling. Cooling is initiated when the batch temperature shows a rate increase of at least 1° C. per minute. The rate of cooling is adjusted to permit a peak temperature in the range of 77° C. to 83° C., as indicated for the first reaction stage. After the peak batch temperature, cooling is ceased, agitation is reduced as indicated in the first stage polymerization, and the batch is held for one hour. Thereafter, the batch is cooled to 15° to 25° C. and the eighth portion is added to form the water-insoluble ammonium carboxylate salt of the copolymer. The latex is then filtered to remove non-dispersible coagulum.

Samples taken after the first and second reaction stages of copolymerization reflect better than 90% conversion of the comonomer charge of the initial reaction stage and better than 96% conversion at the end of the second reaction stage. The resulting latex has a copolymer content of 33%, an average particle size of about 0.25 micron, and a pH of about 6.

*Wire enamel composition*

| | Pounds |
|---|---|
| First portion: Example 5 copolymer latex, 33% | 700 |
| Second portion: | |
|    Deionized water | 97.8 |
|    Concentrated ammonium hydroxide, 28% | 5.3 |
| Third portion: | |
|    Deionized water | 39.1 |
|    Aqueous water-dilutable phenol/formaldehyde condensate, 66% (Bakelite Resin BRL-1100) | 38 |
| | 880.2 |

The first and second portions are blended, then the third portion is blended into the batch which is then filtered through a 10 micron filter. The resulting aqueous coating composition has a non-volatile content of about 28.5%, a pH of about 7.2 and a surface tension of about 60 dynes/cm.

This wire enamel composition adequately meets all the specifications established for this class of enamel based on commercial production of latexes and enamels of the same composition following the teachings of the reference U.S. Patents 2,787,603; 2,866,763; and the copending Bullitt et al. application, Serial No. 688,132, filed October 4, 1957, now U.S. Patent 3,069,375.

The latex wire enamel composition is diluted with water to application solids of about 20% and is coated by commercial operations on 16 gauge copper wire in direct comparison with wire coated with commercial lots of wire enamel of the same composition manufactured by the process defined by the aforementioned Serial No. 688,132. The coating conditions are at a coating speed of 38 feet per minute using a 12-foot oven with sufficient passes to provide a build of about 4 mils in diameter increase, i.e., about 2 mils thickness, the annealing temperature being about 600° C., the oven temperature being about 200° C. at the bottom and 400° C. at the top, and the coating bath having a pH of about 9.4. Samples of coated wire taken from 2400-foot spools of each lot are tested on an arbor winding machine under varying humidity conditions, determining the number of breaks per 100 feet of wire. The following Table I shows the results of this comparison:

TABLE I

| Lot | Relative Humidity, Percent | Average Breaks/100 ft. Wire |
|---|---|---|
| Comparative 1 | 51 | 93 |
| | 32 | 308 |
| | 20 | Over 330 |
| Comparative 2 | 51 | 7 |
| | 32 | 90 |
| | 20 | 150 |
| Comparative 3 | 51 | 15 |
| | 32 | 107 |
| | 20 | 187 |
| Example 5 | 51 | 3 |
| | 32 | 3 |
| | 20 | 4 |

The average in each instance is based on three tests.

In mandrel pull tests using a 0.20 inch mandrel with a 3-pound weight under varying humidity conditions, the wire coated with Example 5 enamel exhibits no cracks in 4 pulls under humidity conditions ranging from 22% to 65% relative humidity. The coated wire from the comparative lots each exhibit a plurality of cracks with one pull at 22% relative humidity. At 65% relative humidity, Comparative Lot 1 exhibits a plurality of cracks with the first pull, and Comparative Lots 2 and 3 exhibit initiation of cracking on the third pull.

In addition to this outstanding performance under coil winding and mandrel tests, the wire coated with the Example 5 enamel exhibits significant improvement over these comparative lots in resistance to "Freon" 22 refrigerant, i.e., monochlorodifluoromethane.

EXAMPLE 6

The recipe and procedure for the preparation of this latex follows that of Example 2 except that the total comonomer composition per 100 parts by weight thereof consists of:

| | |
|---|---|
| (a) Acrylonitrile | 58 |
| (b) Butyl acrylate | 32 |
|    Glycidyl methacrylate | 5 |
| (c) Methacrylic acid | 5 |
| | 100 |

A master batch of this comonomer composition is prepared and divided into equal parts to provide the first comonomer charge (A) and the second comonomer charge (B). These monomers are inhibited with MEHQ as indicated in Example 1. The glycidyl methacrylate is inhibited with 20 p.p.m. of MEHQ. The resulting latex shows excellent monomer conversion of better than 99% at the end of the second stage and excellent yield.

The resulting latex is blended with sufficient water-dilutable heat-reactive phenol/formaldehyde condensate (66%) to provide a ratio of 90 parts copolymer and 10 parts phenolic condensate. The resulting wire enamel is comparable in quality and performance with that of Example 2. The only detectable difference of significance is that the heat-cured enamel of Example 6 is slightly more brittle. This wire enamel exhibits improved resistance to "Freon" 22 refrigerant.

EXAMPLE 7

The recipe and procedure follows that of Example 2 with charge (A) and charge (B) each having the same composition and being of the same weight, 100 parts of the total comonomer composition consisting of:

| | |
|---|---|
| (a) Acrylonitrile | 60 |
| (b) Butyl acrylate | 32 |
| (c) Itaconic acid | 8 |
| | 100 |

Because of the increased number of carboxylic acid moieties in comonomer (c), a greater proportion of ammonium hydroxide is required to provide a pH of about 6 in stabilizing the resulting latex.

This latex formulated into wire enamel with the phenolic condensate exhibits improved resistance to "Freon" 22 refrigerant.

EXAMPLE 8

The recipe and procedure for this latex follows that of Example 2. Charge (A) and charge (B), separately prepared and used in equal weight proportions, have the following respective compositions:

| | Comonomer Charge (A) | Comonomer Charge (B) |
|---|---|---|
| (a) Acrylonitrile | 65 | 58 |
| (b) Butyl acrylate | 32 | 32 |
| (c) Methacrylic acid | 3 | |
|    Butyl acid itaconate | | 10 |
| | 100 | 100 |

The resulting latex and wire enamel prepared therefrom are comparable with those of Example 7.

I claim:

1. An aqueous latex of a water-insoluble copolymer product of two-stage aqueous dispersion copolymerization of a plurality of polymerizable alpha mono-olefinically-unsaturated monomers consisting essentially of (a) acrylonitrile, (b) at least one neutral ester of an alpha mono-olefinically-unsaturated carboxylic acid with a monohydric alcohol free of polymerizable carbon-to-carbon unsaturation, and being composed of carbon, hydrogen and oxygen atoms, and (c) at least one alpha mono-olefinically-unsaturated carboxylic acid having one to two carboxyl moieties per molecule in a proportion sufficient to provide an acid number in the range of 15 to 80 based on the total monomer composition, which comonomer composition is made up of an initial monomer charge (A), which is at least ternary in composition, and a second comonomer charge (B), which is at least binary in composition, said comonomers (a) and (b) being present in both said monomer charges (A) and (B) and said carboxylic acid monomer (c) being present in said monomer charge (A) sufficient to provide an acid number in the range of 15–80, the relative proportions by weight of the respective comonomers (a) and (b) is said comonomer charges (A) and (B) each ranging from 0.8 to 1.2 times the respective relative proportions of (a) and (b) in the total comonomer composition, the relative proportion of (c) in said charge (B) being no greater than about 2 times the proportion of (c) in said monomer charge (A) on a carboxyl basis, the weight ratio of said second charge (B) being from 0.67 to 1.5 parts per part of said first charge (A), monomer conversion of said charge (A) being at least 85% complete prior to charging said monomer charge (B), thereafter monomer conversion being at least 95% complete based on the total comonomer composition, said two-stage copolymerization being conducted with a free radical-generating vinyl polymerization initiator in both stages of the copolymerization.

2. An aqueous latex composition of claim 1 wherein said comonomer charge (B) is at least ternary in composition consisting essentially of the same species of (a), (b) and (c) as are present in said monomer charge (A), the relative proportion of said carboxylic acid monomer in said charge (B) being in the range of 0.5 to 2 times the proportion of said comonomer (c) in said charge (A) on a carboxyl basis.

3. An aqueous latex composition of claim 2 wherein 100 parts of the total monomer composition made up of said charges (A) and (B) consists essentially of (a) 25 to 80 parts of acrylonitrile, (b) at least 15 parts of a neutral ester of said alpha mono-olefinically-unsaturated carboxylic acid having a terminal methylene group and 3 to 5 carbon atoms per molecule with a $C_1$ to $C_8$ saturated aliphatic monohydric alcohol, and (c) said carboxylic acid comonomer having 3 to 5 carbon atoms, 1 to 2 carboxylic acid moieties and one terminal methylene group per molecule 4. A stable aqueous latex composition of claim 3 wherein the copolymer is characterized by the presence therein of ammonium carboxylate moieties as a result of ammoniacal treatment of the carboxylic copolymer sufficient to provide a pH in the range of 5.5 to 8.

5. An aqueous latex composition of claim 4 wherein said comonomers consist essentially of (a) acrylonitrile, (b) at least one acrylic acid ester of a $C_1$ to $C_8$ saturated aliphatic monohydric alcohol which includes at least 50% by weight of said esterifying alcohol as $C_1$ and $C_4$ alkanol, and said (c) carboxylic acid monomer which is monocarboxylic.

6. An aqueous latex composition of claim 5 wherein said plurality of comonomers consists essentially of (a) acrylonitrile, (b) at least one acrylic acid ester of a $C_1$ to $C_4$ alkanol, and (c) methacrylic acid.

7. An aqueous latex composition of claim 6 which includes a water-dilutable, heat-reactive phenol/formaldehyde condensate in a proportion of from about 2 to about 40 parts per 100 parts of said water-insoluble copolymer.

8. An aqueous dispersion two-stage copolymerization process for the preparation of an aqueous latex of a water-insoluble copolymer of a plurality of polymerizable alpha mono-olefinically-unsaturated comonomers consisting essentially of (a) acrylonitrile, (b) at least one polymerizable neutral ester of an alpha mono-olefinically-unsaturated carboxylic acid with a monohydric alcohol which is free of polymerizable carbon-to-carbon unsaturation and is composed of carbon, hydrogen and oxygen atoms, and (c) at least one alpha mono-olefinically-unsaturated carboxylic acid having one to two carboxyl moieties per molecule, which process comprises the steps of (I) supplying said plurality of comonomers as a first monomer charge (A) which is at least ternary in composition and a second monomer charge (B) which is at least binary in composition, said comonomers (a) and (b) being present in both said monomer charges (A) and (B) and said carboxylic acid comonomer (c) being present in said monomer charge (A) sufficient to provide an acid number in the range of 15–80, the relative proportions by weight of the respective comonomers (a) and (b) in said monomer charges (A) and (B) being from about 0.8 to 1.2 times the respective relative proportion of (a) and (b) in the total comonomer composition, the relative proportion by weight of (c) in said charge (B) being no greater than about 2 times the proportion of (c) in said monomer charge (A) on a carboxyl basis, the ratio of said second charge (B) being from about 0.67 to 1.5 parts per part by weight of said first charge (A), the proportion of said carboxylic acid comonomer (c) being sufficient to provide an acid number in the range of 15 to 80 based on the total weight of comonomers of charge (A) plus charge (B), (II) dispersing said charge (A) in an aqueous polymerization medium, (III) initiating and continuing copolymerization of said charge (A) with a soluble free radical-generating vinyl polymerization initiator until conversion of the monomers thereof is at least 85% complete, (IV) dispersing said monomer charge (B) in the resulting aqueous latex of dispersed particulate first-stage water-insoluble copolymer from said first charge (A), (V) initiating copolymerization of said charge (B) with additional said soluble free radical-generating vinyl polymerization initiator and continuing copolymerization until conversion of the total monomer content of charge (A) plus charge (B) is at least 95% complete.

9. The process of claim 8 having said first stage copolymerization conducted at a temperature in the range of 45° C. to 90° C. for a period of 30 to 120 minutes with sufficient said polymerization initiator to provide at least 85% conversion of the monomers of said charge (A) and having said second stage copolymerization conducted at a temperature in the range of 45° C. to 90° C. for a period of 60 to 240 minutes with additional said polymerization initiator sufficient to provide at least 95% conversion of the total monomer content of charge (A) plus charge (B).

10. The process of claim 9 wherein said polymerization initiator is a redox combination present at initiation of said first stage copolymerization in the proportion of 0.05 to 0.15 mole percent of the oxidizing component thereof and in the proportion of 0.03 to 0.1 mole percent of the reducing component thereof based on said first monomer charge (A) and sufficient said redox combination being present at initiation of said second stage copolymerization in the indicated proportions then based on the total monomer content of charge (A) plus charge (B), said total monomer content constituting from 20% to 50% by weight of the aqueous polymerization recipe.

11. The process of claim 10 wherein said copolymerization is conducted with a polyvalent metal ion as an activator for said redox polymerization initiator.

12. The process of claim 8 which includes a further step (VI) of ammoniacally treating the resulting acidic latex of the carboxylic acid copolymer with ammonium hydroxide sufficient to provide the latex with a pH of 5.5 to 8, thereby providing a stabilized latex of the water-insoluble copolymer having ammonium carboxylate moieties.

13. The process of claim 12 which includes a still further step (VII) of blending with said aqueous latex a water-dilutable, heat-reactive condensate of formaldehyde with a member of the group consisting of phenol, urea, melamine, benzoguanamine and mixtures thereof in a proportion of about 2 to 40 parts of said condensate per 100 parts of said copolymer.

14. The process of claim 8 wherein said plurality of comonomers in 100 parts by weight thereof consists essentially of (a) 25 to 80 parts of acrylonitrile, (b) at least 15 parts of at least one said neutral ester which is an ester of a $C_3$ to $C_5$ alpha mono-olefinically-unsaturated carboxylic acid having a terminal methylene group and one to two carboxyl moieties per molecule with a $C_1$ to $C_8$ monohydric alcohol free of polymerizable carbon-to-carbon unsaturation and composed of carbon, hydrogen and oxygen atoms, and (c) at least about 1.7 parts of a $C_3$ to $C_5$ alpha mono-olefinically-unsaturated carboxylic acid having a terminal methylene group and one to two carboxyl moieties per molecule and sufficient to provide said acid number of 15 to 80, said plurality of comonomers (a), (b) and (c) being present in both said monomer charge (A) and said monomer charge (B).

15. The process of claim 14 wherein said plurality of monomers in 100 parts by weight thereof consists essentially of (a) 30 to 70 parts of acrylonitrile, (b) said neutral ester which is an ester of said $C_3$ to $C_5$ carboxylic acid having one carboxyl moiety per molecule with said monohydric alcohol which in 100 parts thereof includes at least 50 parts of a $C_1$ to $C_4$ alkanol, and (c) said $C_3$ to $C_5$ carboxylic acid having one carboxyl moiety per molecule, the weight ratio of said second charge (B) being from 0.8 to 1.25 parts per part of said first charge (A), the relative proportions of the respective comonomers (a), (b) and (c) in said comonomer charges (A) and (B) being from 0.9 to 1.1 times the relative proportions of respective comonomers (a), (b) and (c) in the total comonomer composition.

16. The process of claim 15 wherein said plurality of polymerizable comonomers consists essentially of (a) acrylonitrile, (b) at least one acrylic acid ester of a $C_1$ to $C_4$ alkanol, and (c) methacrylic acid.

17. As an article of manufacture, an electrically conductive metal wire having an improved electrically insulating coating thereon, which coating is the heat-cured coating deposited and coalesced from the aqueous latex composition of claim 7.

References Cited by the Examiner

UNITED STATES PATENTS

| | | | |
|---|---|---|---|
| 2,657,191 | 10/53 | Coover et al. | |
| 2,787,561 | 4/57 | Sanders | 260—29.3 |
| 2,787,603 | 4/57 | Sanders | 260—29.3 |
| 2,866,763 | 12/58 | Sanders | 260—80.5 |
| 3,054,762 | 9/62 | Rees | 260—17 |

LEON J. BERCOVITZ, *Primary Examiner.*

DONALD E. CZAJA, *Examiner.*